US011323390B2

(12) United States Patent
McDonald et al.

(10) Patent No.: US 11,323,390 B2
(45) Date of Patent: *May 3, 2022

(54) REQUEST ARBITRATION BY AGE AND TRAFFIC CLASSES (71) Applicant: Hewlett Packard Enterprise Development LP, Houston, TX (US)

(72) Inventors: Nicholas George McDonald, Fort Collins, CO (US); Darel Neal Emmot, Wellington, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/946,162

(22) Filed: Jun. 8, 2020

(65) Prior Publication Data

US 2020/0304424 A1 Sep. 24, 2020

Related U.S. Application Data (63) Continuation of application No. 15/883,911, filed on Jan. 30, 2018, now Pat. No. 10,693,808.

(51) Int. Cl.
*H04L 12/911* (2013.01)
*H04L 12/863* (2013.01)
*H04L 47/70* (2022.01)
*H04L 47/62* (2022.01)
*H04L 47/625* (2022.01)

(52) U.S. Cl.
CPC ........ *H04L 47/828* (2013.01); *H04L 47/6225* (2013.01); *H04L 47/6255* (2013.01); *H04L 47/6285* (2013.01)

(58) Field of Classification Search
CPC .............. H04L 47/828; H04L 47/6225; H04L 47/6255; H04L 47/6285
See application file for complete search history.

(56) References Cited

U.S. PATENT DOCUMENTS

| 7,133,399 | B1 | 11/2006 | Brewer et al. |
| 7,137,119 | B1 | 11/2006 | Sankaranarayan et al. |
| 7,283,558 | B2 | 10/2007 | Ferolito |
| 7,412,551 | B2 | 8/2008 | Bose et al. |
| 7,512,729 | B2 | 3/2009 | Bose et al. |
| 7,653,069 | B2 | 1/2010 | Lakshmanamurthy et al. |
| 2003/0165151 | A1 | 9/2003 | Chao et al. |

(Continued)

OTHER PUBLICATIONS

International Search Report and Written Opinion received for PCT Patent Application No. PCT/US19/015573, dated May 1, 2019, 10pages.

(Continued)

*Primary Examiner* — Eric Myers
(74) *Attorney, Agent, or Firm* — Hewlett Packard Enterprise Patent Department (57) ABSTRACT Example implementations relate to hybrid arbitration of requests for access to a shared pool of resources. An example implementation includes receiving a set of requests for access to the shared pool of resources. The requests may each be from any number of traffic classes. A traffic class may be selected according to turn-based arbitration logic. Additionally, a request from each traffic class of a subset of received requests may be selected. A request selected by the age-based arbitration logic and of the selected traffic class may be granted access to the shared pool of resources.

20 Claims, 8 Drawing Sheets (56) References Cited

U.S. PATENT DOCUMENTS

| | | |
|---|---|---|
| 2003/0223420 A1 | 12/2003 | Ferolito |
| 2005/0246463 A1 | 11/2005 | Barrick |
| 2006/0101178 A1 | 5/2006 | Zhong et al. |
| 2006/0101179 A1 | 5/2006 | Lee et al. |
| 2008/0288689 A1 | 11/2008 | Hoang et al. |
| 2012/0036412 A1 | 2/2012 | Sugawara |
| 2012/0096204 A1 | 4/2012 | Auerbach et al. |
| 2012/0226833 A1 | 9/2012 | Mostinski et al. |
| 2015/0019731 A1 | 1/2015 | Abts |
| 2016/0188529 A1 | 6/2016 | Nagarajan et al. |
| 2017/0270066 A1 | 9/2017 | Gopalakrishnasetty et al. |

OTHER PUBLICATIONS

Lee, M. et al., "Approximating Age-based Arbitration in On-Chip Networks," (Research Paper), Sep. 11-15, 2010, pp. 575-576, http://people.csail.mit.edu/leejw/pact10_age.p.

"The Multiplexer: Electronics Tutorials", Online available at <http://web.archive.org/web/20160831193127/http://www.electronics-tutorials.ws:80/combination/comb_2.html> Aug. 31, 2016, 11 pages.

Burr et al., "Digital Signal Processing Systems: Implementation Techniques", Demultiplexer, online available at < https://www.sciencedirect.com/topics/engineering/demultiplexer >, 1995, 17 pages.

REQUEST ARBITRATION BY AGE AND TRAFFIC CLASSES

CROSS-REFERENCE TO RELATED APPLICATIONS

This application is a continuation application of and claims priority to application Ser. No. 15/883,911, filed on Jan. 30, 2018, the contents of which are hereby incorporated by reference in their entireties.

BACKGROUND

An arbiter is an electronic device that may be utilized to regulate access to shared resources. Arbiters may be implemented as electronic circuitry such as application-specific integrated circuits (ASICs). An arbiter may receive multiple concurrent read and/or write requests to access shared computational resources and may serially grant received requests access to the shared resources.

Various schemes may be employed for fairly granting access to requests. For example, where requests are received by the arbiter from multiple clients, the arbiter may utilize a turn-based scheme such that an equal number of requests may be granted for each client.

BRIEF DESCRIPTION OF THE DRAWINGS

Certain examples are described in the following detailed description and in reference to the drawings, in which.

DETAILED DESCRIPTION OF SPECIFIC EXAMPLES

Requests for access to a shared pool of resources may be grouped into traffic classes. A traffic class is an isolated group of virtual channels that are categorized by any number of parameters. Dividing virtual channels into traffic classes enables performance isolation between different flows or groups of network traffic. A traffic class may be defined, for example, by any number of traffic sources, such as an address block, a number of devices and/or clients, a workspace, a combination thereof, or any other source of network traffic. Different traffic classes may concurrently request access to shared resources, and arbiters may implement various schemes to promote fairness between the different traffic classes.

A turn-based scheme, for example, may take turns granting requests to each traffic class. One such example of a turn-based scheme is round-robin arbitration. Round-robin arbitration is a scheme including logic that implements a circular counter to grant requests from traffic classes in a cyclical fashion. An arbiter implementing a round-robin scheme will serve a traffic class by granting a predetermined amount of requests from the traffic class or grant requests from the traffic class for a predetermined time, after which the traffic class will be ordered last, and a next-in-line traffic class will be served.

Another example of a turn-based scheme is Least Recently Used (LRU) arbitration. An arbiter implementing an LRU scheme may maintain an ordered list of traffic classes. To grant a request, the arbiter may scan the list by priority, and grant a request from a traffic class having both a highest priority and an active request. Once the arbiter provides the grant to the traffic class, the arbiter may lower the priority of the traffic class. The traffic class with the granted request may, for instance, be reprioritized to have a lowest priority among the listed traffic classes. Like, round-robin arbitration, LRU arbitration provides fairness such that each traffic class is given its "turn."

In some example implementations, traffic classes may be granted weighted priority such that traffic classes having greater weight may be granted a greater number of requests than a traffic class having a lesser weight. This can be implemented a number of ways. For instance, a traffic class with a greater weight may be lowered in priority after a larger number of request grants than a traffic class with a lesser weight; a traffic class with a greater weight may not be lowered to as great a degree in priority after a request grant as would a traffic class having a lesser weight; etc.

Age-based arbitration is another example arbitration scheme. An arbiter implementing age-based arbitration provides grants to requests having a greatest age among requests to be granted by the arbiter. The age of a request may be determined by the time since the request was initiated, by the time the request existed in a queue of requests to be granted access by the arbiter, by the number of times a request was not selected among received requests to be granted access to received resources, etc.

Age-based arbitration ensures fairness among requests: requests of a greatest age will be served irrespective of the traffic class from which the request was derived. Thus, age-based arbitration alone may not facilitate traffic class isolation. When implementing a turn-based arbitration scheme for example, traffic classes may each be granted in turn. Conversely, an age-based arbitration scheme may favor a first traffic class where a larger percentage of requests are initiated from the first traffic class than from a second traffic class. In some examples, the first traffic class may clog the network with requests such that requests from other traffic classes fail to grant.

A hybrid arbitration approach is proposed that facilitates age-based arbitration by traffic class. By utilizing hybrid arbitration, fair access may be maintained across clients and/or devices via age-based arbitration while concurrently maintaining fair access across traffic classes via turn-based arbitration. Specifically, the arbitration device may include turn-based arbitration logic to receive a first set of requests derived from different traffic classes and select a traffic class from the different traffic classes according to a turn-based arbitration scheme. The hybrid arbiter may further include age-based arbitration logic to receive a second set of requests derived from the different traffic classes. In an example, the second set of requests may include any number of the first set of requests, and may include at least requests of the first set of requests of the selected traffic class. The age-based arbitration logic may select a request from each of the different traffic classes of the requests received according to an age-based arbitration scheme. A request selected by the age-based arbitration logic and of the traffic class selected by the turn-based arbitration logic may be granted access to a shared pool of resources.

Figure 1:
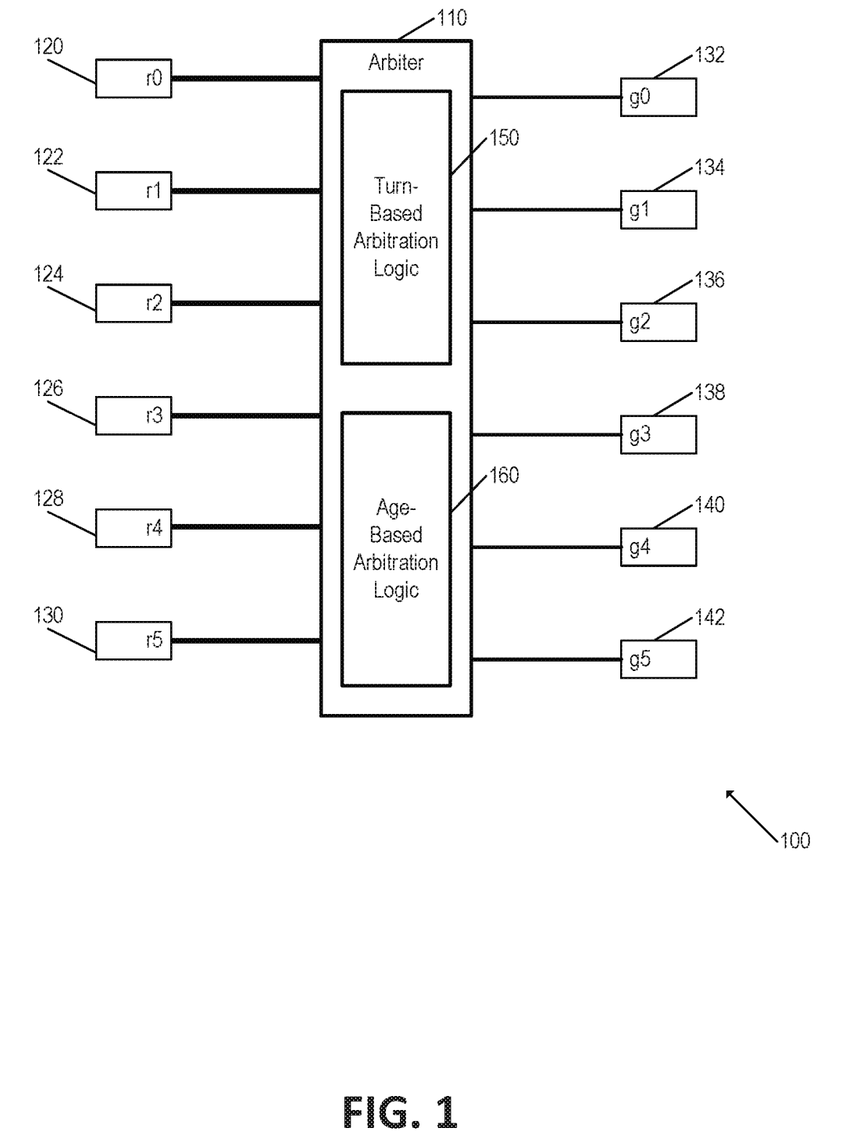
FIG. 1 is a block diagram illustrating an example device for hybrid arbitration of requests.

FIG. 1 is a block diagram illustrating an example device 100 for hybrid arbitration of requests. As illustrated, Arbiter 110 may receive any number of requests from requesters r0-r5, 120-130 respectively. Each request received may be associated with a traffic class. In some example implementations, each requester may be associated with any number of traffic classes such that requests received on a requester associated with a particular traffic class are associated with that traffic class. While six example requesters are illustrated, any number of requesters to carry any number of requests may be implemented.

Arbiter 110 may determine which requests from which traffic class are to receive a grant, the grant to be transmitted on grant lines g0-g5, 132-142 respectively. Arbiter 110 may be implemented as hardware or a combination of hardware and software/firmware. To determine which requests are to be granted, arbiter 110 may employ hybrid arbitration logic. Specifically, the requests may be received by turn-based arbitration logic 150 of arbiter 110 and age-based arbitration logic 160 of arbiter 110. Turn-based arbitration logic 150 of arbiter 110 and age-based arbitration logic 160 of arbiter 110 may be implemented as logical circuitry and may include any number of application-specific integrated circuits (ASICs). Furthermore, while example FIG. 1 illustrates turn-based arbitration logic 150 and age-based arbitration logic 160 within arbiter 110, turn-based arbitration logic 150 and age-based arbitration logic 160 may be implemented within any number of arbiters.

Turn-based arbitration logic 150 may receive a first set of requests from requesters r0-r5. The received set of requests may be associated with a plurality of different traffic classes. Turn-based arbitration logic 150 may select a traffic class from among the plurality of different traffic classes, and in an example, may select the traffic class according to a turn-based arbitration scheme as detailed above.

Age-based arbitration logic 160 may receive a second set of requests from requesters r0-r5. In some example implementations, the second set of requests may be the first set of requests or the second set of requests may be a subset of the first set of requests. The second set of requests may be, for example, requests of the first set of requests associated with a particular traffic class, such as the traffic class selected by turn-based arbitration logic 150.

Age-based arbitration logic 160 may select a request from each traffic class of the requests received according to an age-based arbitration scheme as detailed above. In an example, arbiter 110 may grant a request that was selected by both turn-based arbitration logic 150 and age-based arbitration logic 160. The granted request may be granted on an associated grant line of grant lines g0-g5. Accordingly, arbiter 110 may implement a hybrid arbitration scheme in which both turn-based arbitration logic 150 and age-based arbitration logic 160 are employed.

Figure 2:
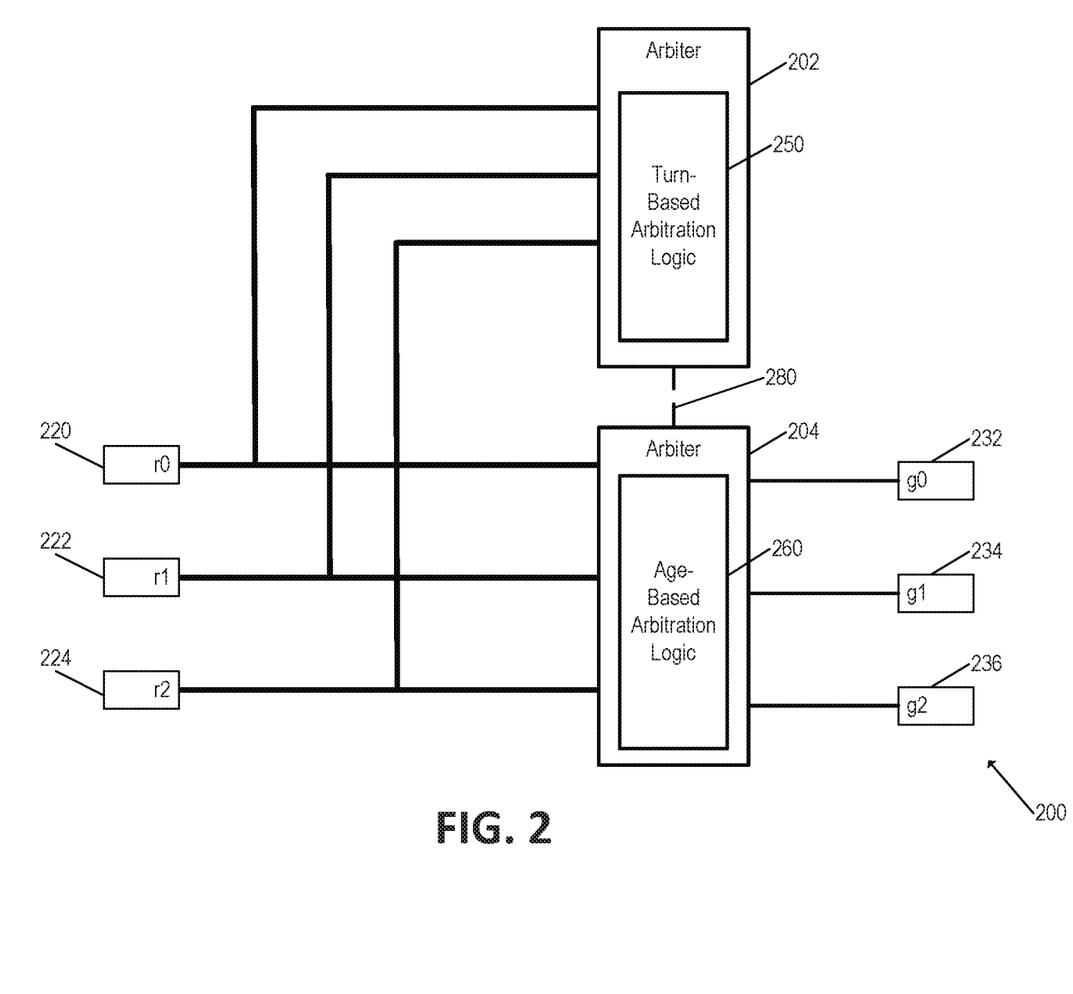
FIG. 2 is a block diagram illustrating an example system for hybrid arbitration of requests utilizing a plurality of arbiters.

FIG. 2 is a block diagram illustrating an example system 200 for hybrid arbitration of requests utilizing a plurality of arbiters. As illustrated, Arbiter 202 and arbiter 204 may receive any number of requests from requesters r0-r2, 220-224 respectively. Each request received may be associated with a traffic class. In some example implementations, each requester may be associated with any number of traffic classes such that requests received on a requester associated with a particular traffic class are associated with that traffic class. While three example requesters are illustrated, any number of requesters to carry any number of requests may be implemented.

Arbiter 202 and arbiter 204 may be implemented as hardware or a combination of hardware and software/firmware. In this example, arbiter 202 includes turn-based arbitration logic 250, and arbiter 204 includes age-based arbitration logic 260. Turn-based arbitration logic 150 of arbiter 110 and age-based arbitration logic 160 of arbiter 110 may be implemented as logical circuitry and may include any number of application-specific integrated circuits (ASICs).

Arbiter 202, upon receiving requests from any of requesters r0-r2, may, according to turn-based arbitration logic 250, select a traffic class from among a plurality of different traffic classes of the received requests, and in an example, may select a traffic class according to a turn-based arbitration scheme as detailed above. Arbiter 202 may further output a control signal value 280 indicating the selected traffic class.

While arbiter 202 may implement turn-based arbitration logic 250 to select a traffic class from among a plurality of different traffic classes, arbiter 204 may select a request from a particular traffic class with age-based arbitration logic 260. As illustrated in example FIG. 2, arbiter 204 may receive control signal value 280, indicating the traffic class selected by arbiter 202, as well as the requests received from requesters r0-r2. In some example implementations, arbiter 204 may implement age-based arbitration logic 260 to select a request from each of the traffic classes with which the received requests are associated. In some example implementations, age-based arbitration logic 260 may receive requests of the traffic classes selected by arbiter 202 and as indicated by received control signal value 280. Age-based arbitration logic 260 may select a request from the traffic class selected by arbiter 202 according to an age-based arbitration scheme as detailed above.

A request selected by arbiter 204 and of the traffic class selected by arbiter 202 may be granted, and in this example implementation, may be granted on any of respective grant lines 232, 234, or 236. In the example depicted in FIG. 2, arbiter 204 is depicted as the grant transmitter; however, in other example implementations, the signal output of arbiter 202 and the selected requests of arbiter 204 may be sent to any number of other devices for grant transmission. In yet another example implementation, the requests selected by arbiter 204 may be received by arbiter 202, and arbiter 202 may issue the grant.

Figure 3:
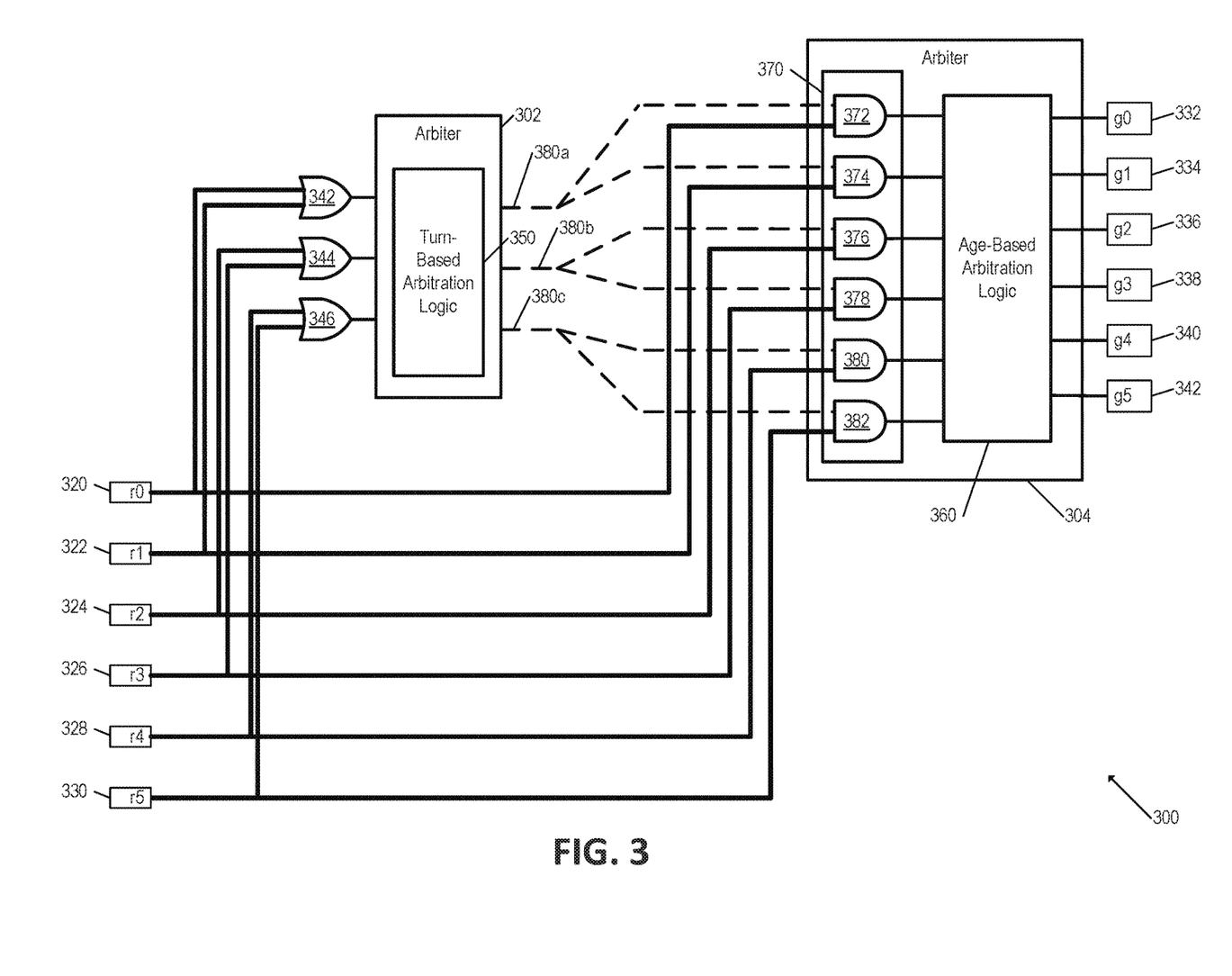
FIG. 3 is a block diagram illustrating another example system 300 for hybrid arbitration of requests.

FIG. 3 is a block diagram illustrating another example system 300 for hybrid arbitration of requests. System 300 may include arbiter 302 and arbiter 304, which may be implemented as hardware or a combination of hardware and software/firmware. In this example, arbiter 302 includes turn-based arbitration logic 350, and arbiter 304 includes age-based arbitration logic 360 as well as selector 370. Turn-based arbitration logic 350 of arbiter 110, and selector 370 and age-based arbitration logic 160 of arbiter 110, may be implemented as logical circuitry and may include any number of application-specific integrated circuits (ASICs).

As illustrated, Arbiter 302 may receive any number of requests from requesters r0-r5, 320-330 respectively. Each request received may be associated with any number of traffic classes. In this example, each requester may be associated with a traffic class such that requests received on a requester associated with a particular traffic class are associated with that traffic class.

For example, OR gates 342-346 may map requests to respective traffic classes before they are received by arbiter 302. In this illustrated example, r0 and r 1, 320 and 322 respectively, may be mapped to a first traffic class by OR gate 342; r2 and r3, 324 and 326 respectively, may be mapped to a second traffic class by OR gate 344; and r4 and r5, 328 and 330 respectively, may be mapped to a third traffic class by OR gate 346. By mapping requests from requesters to respective traffic classes, turn-based arbitration logic 350 may select a traffic class according to a turn-based arbitration scheme from a traffic class having an active request. While six example requesters are illustrated, any number of requesters to carry any number of requests may be implemented. Additionally, while requesters 320-330 are mapped to three example traffic classes, requesters 320-330 may be mapped to any number of traffic classes.

Arbiter 302, upon receiving requests from any of requesters r0-r5, may, according to turn-based arbitration logic 350, select a traffic class from among a plurality of different traffic classes of the received requests, and in an example, may select a traffic class according to a turn-based arbitration scheme as detailed above. Arbiter 302 may further output any number of control signal values 280 indicating the selected traffic class. The control signal value may be received by arbiter 304, and may specifically be received by selector 370 of arbiter 304. The control signal values may, for example, indicate which of AND gates 372-382 of selector 370 receives a "1" and which of AND gates 372-382 of selector 380 receives a "0". In this example implementation, control signal 380 enables requests of the traffic class selected at arbiter 302 to pass through selector 370 to be received by age-based arbitration logic 360. In other words, a control signal value may indicate a selected traffic class by enabling requests of the selected traffic class to pass through a selector.

Age-based arbitration logic 360 may receive a second set of requests from requesters r0-r5. For example, selector 370 may pass requests of any traffic class selected by arbiter 302. In this example, the second set of requests from requesters r0-r5 may be requests of the first set of requests and associated with any traffic class selected by arbiter 302.

Age-based arbitration logic 360, upon receiving the second set of requests, may select a request from each traffic class of the requests received according to an age-based arbitration scheme as detailed above. By filtering requests through selector 370 by respective traffic class, and selecting requests from each traffic class according to age-based arbitration logic 360, arbiter 304 may select a request of a particular traffic class and according to an age-based arbitration scheme. The selected request may be granted on an associated grant line g0-g5, 332-342 respectively.

FIG. 3 is a block diagram illustrating another example system 300 for hybrid arbitration of requests. System 300 may include arbiter 302 and arbiter 304, which may be implemented as hardware or a combination of hardware and software/firmware. In this example, arbiter 302 includes turn-based arbitration logic 350, and arbiter 304 includes age-based arbitration logic 360 as well as selector 370. Turn-based arbitration logic 350 of arbiter 110, and selector 370 and age-based arbitration logic 160 of arbiter 110, may be implemented as logical circuitry and may include any number of application-specific integrated circuits (ASICs).

As illustrated, Arbiter 302 may receive any number of requests from requesters r0-r5, 320-330 respectively. Each request received may be associated with a traffic class. In this example, each requester may be associated with a traffic class such that requests received on a requester associated with a particular traffic class are associated with that traffic class.

For example, OR gates 342-346 may map requests to respective traffic classes before they are received by arbiter 302. In this illustrated example, r0 and r1, 320 and 322 respectively, may be mapped to a first traffic class by OR gate 342; r2 and r3, 324 and 326 respectively, may be mapped to a second traffic class by OR gate 344; and r4 and r5, 328 and 330 respectively, may be mapped to a third traffic class by OR gate 346. By mapping requests from requesters to respective traffic classes, turn-based arbitration logic 350 may select a traffic class according to a turn-based arbitration scheme from a traffic class having an active request. While six example requesters are illustrated, any number of requesters to carry any number of requests may be implemented. Additionally, while requesters 320-330 are mapped to three example traffic classes, requesters 320-330 may be mapped to any number of traffic classes.

Arbiter 302, upon receiving requests from any of requesters r0-r5, may, according to turn-based arbitration logic 350, select a traffic class from among a plurality of different traffic classes of the received requests, and in an example, may select a traffic class according to a turn-based arbitration scheme as detailed above. Arbiter 302 may further output any number of control signal values, e.g. control signal value 380$a$, control signal value 380$b$, and control signal value 380$c$, indicating the selected traffic class. A control signal value may be received by arbiter 304, and may specifically be received by selector 370 of arbiter 304. The control signal values may, for example, be transmitted as a "1" to AND gates 372-382 of selector 370 and may be transmitted as a "0" to AND gates 372-382 of selector 380. In this example implementation, control signal 380 enables requests of the traffic class selected at arbiter 302 to pass through selector 370 to be received by age-based arbitration logic 360. In other words, a control signal value may indicate a selected traffic class by enabling requests of the selected traffic class to pass through a selector.

Age-based arbitration logic 360 may receive a second set of requests from requesters r0-r5. For example, selector 370 may pass requests of any traffic class selected by arbiter 302. In this example, the second set of requests from requesters r0-r5 may be requests of the first set of requests and associated with any traffic class selected by arbiter 302.

Age-based arbitration logic 360, upon receiving the second set of requests, may select a request from each traffic class of the requests received according to an age-based arbitration scheme as detailed above. By filtering requests through selector 370 by respective traffic class, and selecting requests from each traffic class according to age-based arbitration logic 360, arbiter 304 may select a request of a particular traffic class and according to an age-based arbitration scheme. The selected request may be granted on an associated grant line g0-g5, 332-342 respectively.

Figure 4:
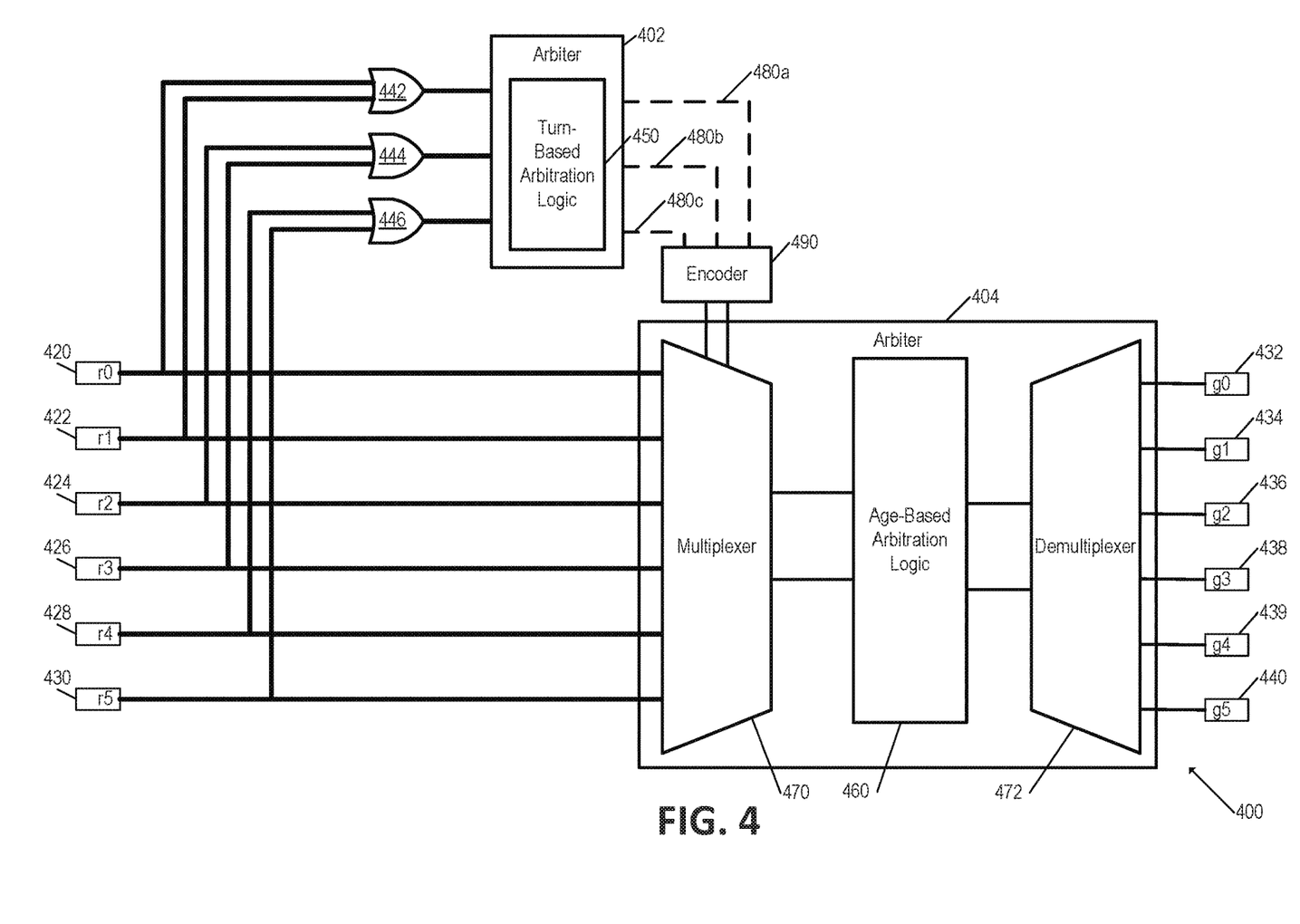
FIG. 4 is a block diagram illustrating another example system 400 for hybrid arbitration of requests.

FIG. 4 is a block diagram illustrating another example system 400 for hybrid arbitration of requests. System 400 may include arbiter 402 and arbiter 404, which may be implemented as hardware or a combination of hardware and software/firmware. In this example, arbiter 402 includes turn-based arbitration logic 450, and arbiter 404 includes age-based arbitration logic 460 as well as multiplexer 470 and demultiplexer 472. Turn-based arbitration logic 450 of arbiter 402, and multiplexer 470, demultiplexer 472, and age-based arbitration logic 460 of arbiter 404, may be implemented as logical circuitry and may include any number of application-specific integrated circuits (ASICs).

As illustrated, arbiter 402 may receive any number of requests from requesters r0-r5, 420-430 respectively. Each request received may be associated with a traffic class. In this example, each requester may be associated with a traffic class such that requests received on a requester associated with a particular traffic class are associated with that traffic class.

For example, OR gates 442-446 may map requests to respective traffic classes before they are received by arbiter 402. In this illustrated example, r0 and r1, 420 and 422 respectively, may be mapped to a first traffic class by OR gate 442; r2 and r3, 424 and 426 respectively, may be mapped to a second traffic class by OR gate 444; and r4 and r5, 428 and 430 respectively, may be mapped to a third traffic class by OR gate 446. By mapping requests from requesters to respective traffic classes, turn-based arbitration logic 450 may select a traffic class according to a turn-based arbitration scheme from a traffic class having an active request.

Arbiter 402, upon receiving requests from any of requesters r0-r5, may, according to turn-based arbitration logic 450, select a traffic class from among a plurality of different traffic classes of the received requests, and in an example, may select a traffic class according to a turn-based arbitration scheme as detailed above. Arbiter 402 may further output any number of control signal values 480, e.g. 480a, 480b, and 480c, indicating the selected traffic class. In some example implementations, the control signal value may be received by encoder 490, to be translated and thereafter received by multiplexer 470 of arbiter 404. While encoder 490 is illustrated as a separate component in this example, encoder 490 may, in some examples, be included in arbiter 404, and may specifically be included in the logic of multiplexer 470.

Multiplexer 470 may receive the encoded signal output of arbiter 402 as well as requests 420-430, and may output a subset of requests 420-430. The subset of requests may be the full set of requests, such as requests 420-430, or the subset of requests may be requests of the set of any number of particular traffic classes, such as the selected traffic class.

The request subset may be received by age-based arbitration logic 460. Age-based arbitration logic 460, upon receiving the request subset, may select a request from each traffic class of the requests received according to an age-based arbitration scheme as detailed above. By filtering requests through multiplexer 370 by respective traffic class, and selecting requests from each traffic class according to age-based arbitration logic 360, arbiter 304 may select requests of particular traffic classes and according to an age-based arbitration scheme.

The selected request may be granted on an associated grant line. Specifically, the requests selected by age-based arbitration logic 460 may be transmitted to demultiplexer 472, which may transmit a grant on any of grant lines g0-g5, 432-440 respectively, associated with the requesters on which requests 420-430 originated. Accordingly, an age-based arbitration scheme by traffic class may be utilized to transmit grants for requests to access a shared pool of resources.

Figure 5:
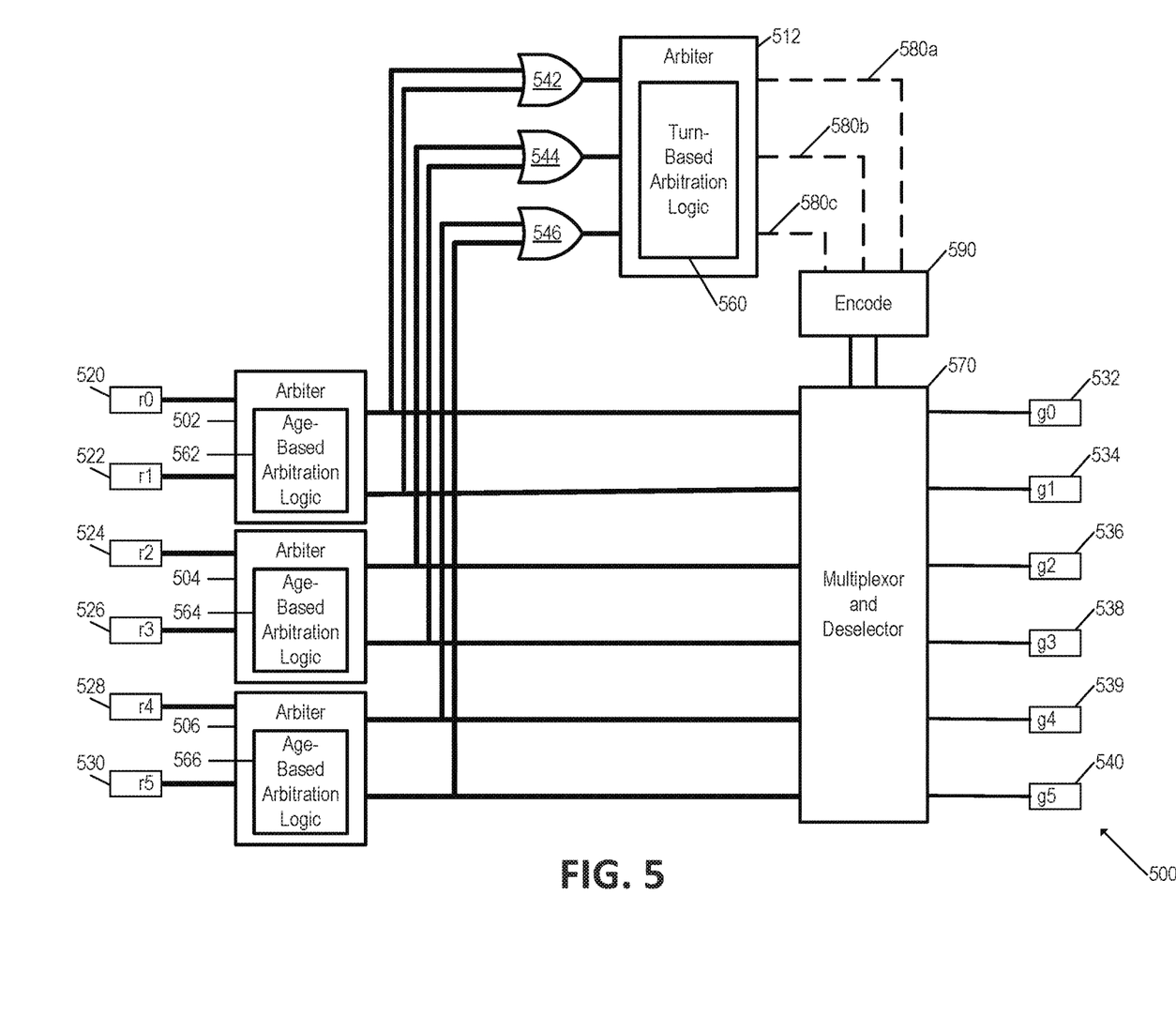
FIG. 5 is a block diagram illustrating another example system 500 for hybrid arbitration of requests.

FIG. 5 is a block diagram illustrating another example system 500 for hybrid arbitration of requests. System 500 may include arbiters 502-506 implementing age-based arbitration logic, 562-566 respectively, and arbiter 512 implementing turn-based arbitration logic 560. Arbiters 502-506 and arbiter 512 may be implemented as hardware or a combination of hardware and software/firmware. Turn-based arbitration logic 560 of arbiter 512, and age-based arbitration logic 562-566 of arbiters 502-506 respectively, may be implemented as logical circuitry and may include any number of application-specific integrated circuits (ASICs).

As illustrated, arbiter 502 may receive any number of requests from requesters 520-522, arbiter 504 may receive any number of requests from requesters 524-526, and arbiter 506 may receive any number of requests from requesters 528-530. Each request received may be associated with a traffic class. For instance, each requester may be associated with a traffic class such that requests received on a requester associated with a particular traffic class are associated with that traffic class.

In an example, each arbiter may receive requests from a different traffic class. Specifically, arbiter 502 may receive requests 520-522 from requesters associated with a first traffic class, arbiter 504 may receive requests 524-526 from requesters associated with a second traffic class, and arbiter 506 may receive requests 528-530 from requesters associated with a third traffic class. Although six example requesters and three example arbiters having age-based arbitration logic are illustrated, any number of requesters and arbiters may be implemented.

The requests may be received by age-based arbitration logic 562-566. Age-based arbitration logic 562-566, upon receiving the requests, may select a request from each traffic class of the requests received according to an age-based arbitration scheme as detailed above. In an example, where each arbiter receives requests from a different traffic class, the age-based arbitration logic of each arbiter may select a request from the traffic class of the requests received according to an age-based arbitration scheme. Accordingly, a request from each traffic class may be selected by arbiters 502-506.

The selected requests of each traffic class may be mapped to their respective traffic classes. In an example, OR gates 542-546 may map requests to respective traffic classes before they are received by arbiter 512. In this illustrated example, r0 and r1, 520 and 522 respectively, may be mapped to a first traffic class by OR gate 542; r2 and r3, 524 and 526 respectively, may be mapped to a second traffic class by OR gate 544; and r4 and r5, 528 and 530 respectively, may be mapped to a third traffic class by OR gate 546. By mapping requests from requesters to respective traffic classes, turn-based arbitration logic 560 may select a traffic class according to a turn-based arbitration scheme from a traffic class having an active request.

Arbiter 512, upon receiving requests from any of requesters r0-r5, may, according to turn-based arbitration logic 560, select a traffic class from among a plurality of different traffic classes of the received requests, and in an example, may select a traffic class according to a turn-based arbitration scheme as detailed above. Arbiter 512 may further output any number of control signal values 580, e.g. 580a, 580b, and 580c, indicating the selected traffic class. In some example implementations, the control signal value may be received by encoder 590, to be translated and thereafter received by multiplexer and deselector 570. While encoder 490 is illustrated as a separate component in this example, encoder 490 may, in some examples, be included in arbiter 512 or multiplexor and deselector 570.

Multiplexer and deselector 570 may receive the encoded signal output of arbiter 512 indicating a selected traffic class as well as the requests selected by arbiters 502-506, and may output any of the requests selected by arbiters 502-506 that is of the selected traffic class. The requests may specifically output on an associated grant line. For instance, a grant may be transmitted on any of grant lines g0-g5, 532-540 respectively, associated with the requesters on which requests 520-530 originate.

Figure 6:
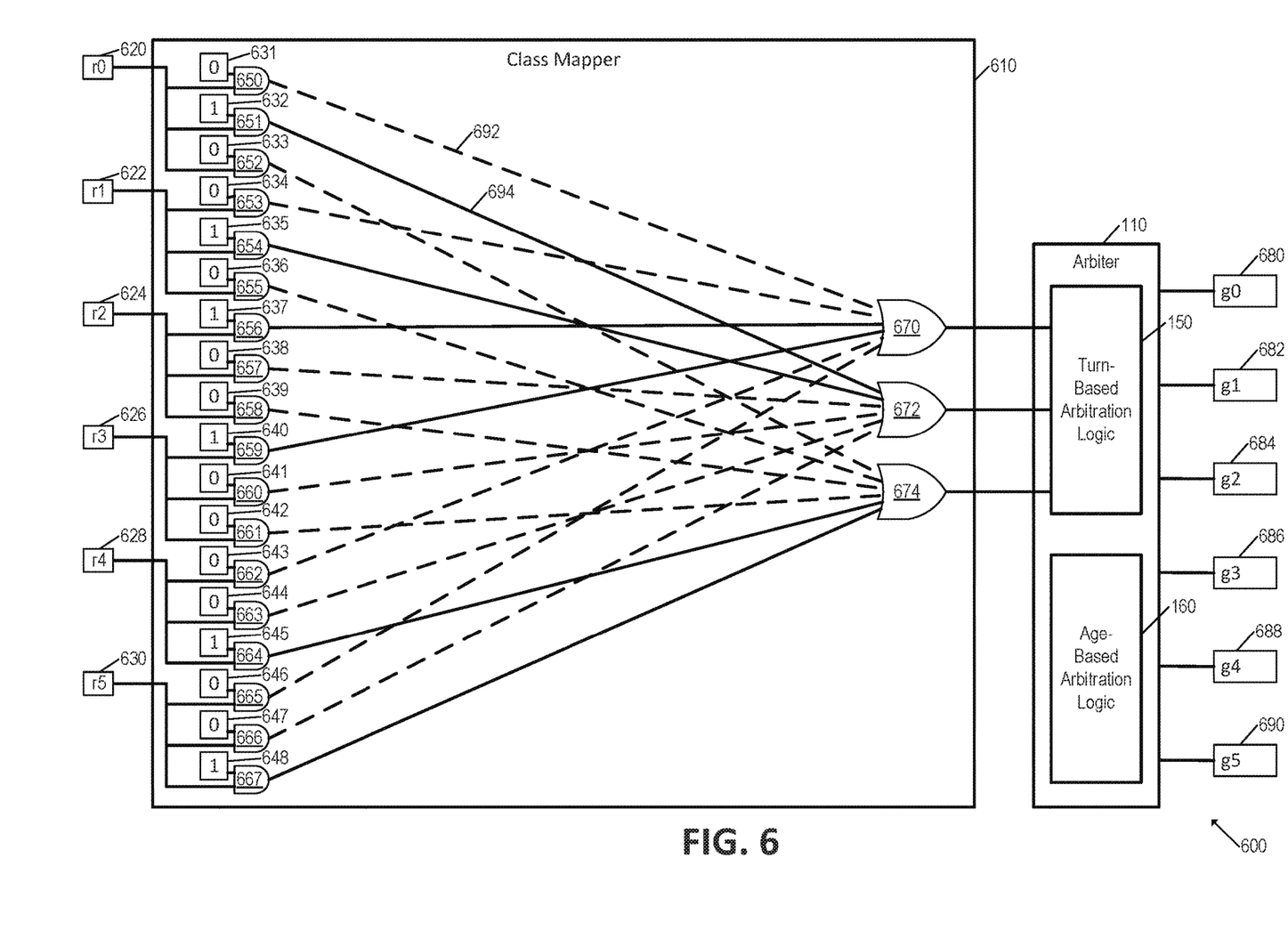
FIG. 6 is a block diagram of an example arbitration system 600 for mapping requesters to traffic classes to utilize a hybrid arbitration scheme.

FIG. 6 is a block diagram of an example arbitration system 600 for mapping requesters to traffic classes to utilize a hybrid arbitration scheme. System 600 may include similar architecture to that of device 100. For clarity and conciseness, some of the components of system 600 may be described with reference to device 100 of FIG. 1, including arbiter 110 having turn-based arbitration logic 150 and age-based arbitration logic 160.

As illustrated, class mapper 610 may receive any number of requests from requesters r0-r5, 620-630 respectively. Each request received may be associated with a traffic class. In this example, class mapper 610 may map requesters to traffic classes such that requests received on a requester mapped to a particular traffic class are associated with that traffic class. In an example, the mapping of requesters to traffic classes may be programmable and each requester may be programmed to map to a traffic class.

A specific example implementation of a programmable class mapper is illustrated in FIG. 6. Specifically, AND gates 650-667 may be programmed with a "0" or a "1," blocks 631-648 respectively, to indicate to which of three potential traffic classes a requester may be mapped. A dashed line, e.g. dashed line 692, may indicate an inactive signal while a solid line, e.g. solid line 694 may indicate an active signal. As illustrated, requests from requesters of a first traffic class may be received by OR gate 670, requests from requesters of a second traffic class may be received by OR gate 672, and requests from requesters of a third traffic class may be received by OR gate 674. Requester 620, requester 622, and requester 628, as illustrated, are mapped to OR gate 672, i.e. the second traffic class. Requester 624, and requester 626, as illustrated, are mapped to OR gate 670, i.e. the first traffic class, and requester 628 and requester 630, as illustrated, are mapped to OR gate 674, i.e. the third traffic class. Thus, each requester may be programmed to map to a particular traffic class. While six example requesters are mapped to three example traffic classes in this implementation, any number of requesters may be mapped to any number of traffic classes.

A traffic class may be considered active where a request is received from a requester mapped to that traffic class. Turn-based arbitration logic 150 may receive the active traffic classes from class mapper 610 and may select a traffic class according to any of the turn-based schemes described above. Age-based arbitration logic 160 may further select a request from a subset of received requests (not shown) and select a request from each traffic class of the received requests according to an age-based arbitration scheme as described above. Requests selected by the age-based arbitration logic and of the selected traffic class may be granted on any of grant lines 680-690.

Figure 7:
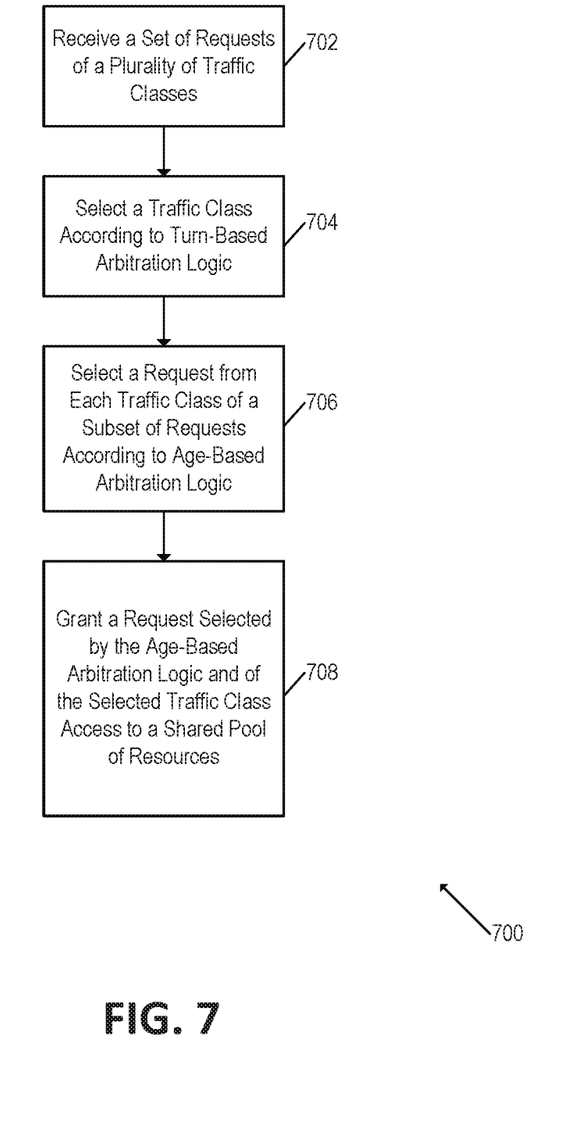
FIG. 7 is a flowchart illustrating a method 700 for implementing age-based arbitration by traffic class.

FIG. 7 is a flowchart illustrating a method 700 for implementing age-based arbitration by traffic class. Although execution of method 700 is described below with reference to system 200, other suitable components for execution of method 700 may be utilized. Additionally, the components for executing method 700 may spread among multiple devices. Method 700 may be implemented in the form of executable instructions stored on a machine-readable storage medium and/or in the form of electronic circuitry, e.g. hardware. In some examples, steps of method 700 may be executed substantially concurrently or in a different order than shown in FIG. 7. In some examples, method 700 may include more or less steps than are shown in FIG. 7. In some examples, some of the steps of method 700 may, at certain times, be ongoing and/or may repeat.

At block 702, a set of requests of a plurality of traffic classes may be received, e.g. requests 220-224. In an example, the set of requests may be received at an arbiter, such as arbiter 202. Each request received may be associated with a traffic class, and each request may be associated with any number of different traffic classes. For example, request 220 may be associated with a first traffic class and request 222 may be associated with a second traffic class. At block 704, a traffic class of the set of requests may be selected by turn-based arbitration logic 704. The traffic class may be selected, for example, by turn-based arbitration logic 250 of arbiter 202. The traffic class may be selected by any of the turn-based arbitration schemes as described above.

At block 706, a request may be selected from each traffic class of a subset of received requests according to age-based arbitration logic 260. In an example, the subset of requests may be received at an arbiter, such as arbiter 204. The subset of requests may be the full set of requests, such as requests 220-224, or the subset of requests may be requests of the set of a particular traffic class, such as the selected traffic class. The request from each traffic class of the received requests may be selected according to any of the age-based arbitration schemes described above. At block 708, a request selected by the age-based arbitration logic 260 and of the selected traffic class may be granted, i.e. through any of grant lines 232-236, and specifically, may be granted access to a shared pool of resources.

Figure 8:
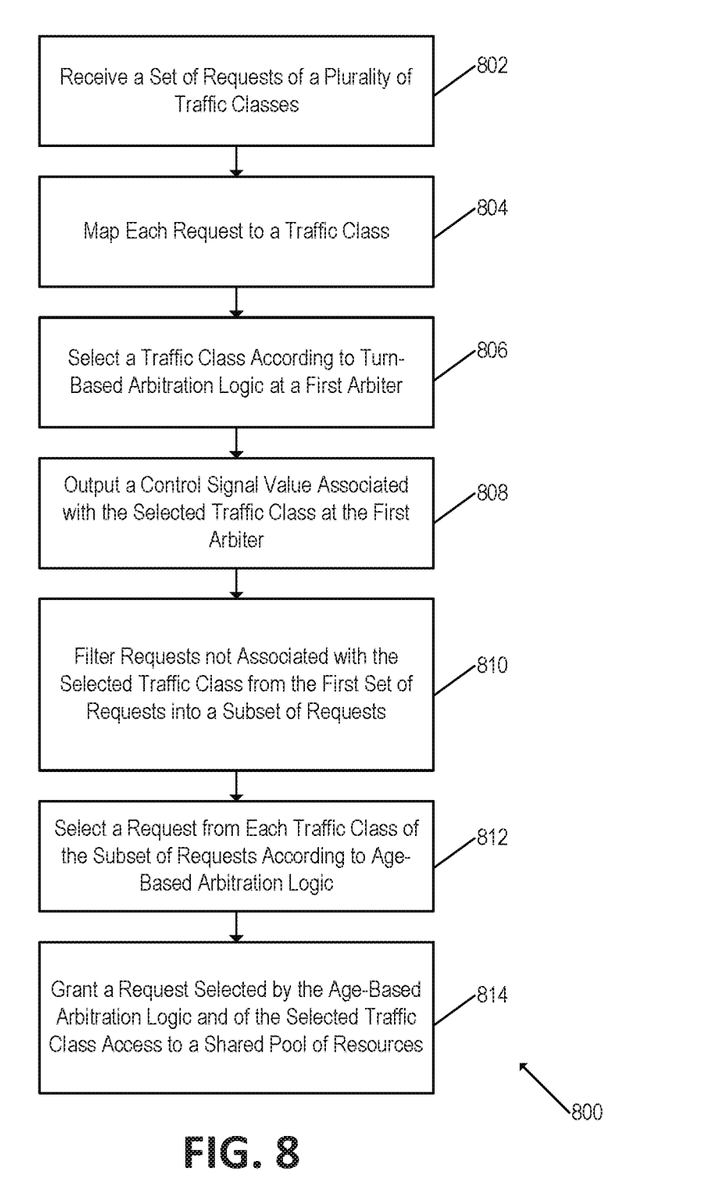
FIG. 8 is a flowchart illustrating a method 800 for implementing age-based arbitration by traffic class.

FIG. 8 is a flowchart illustrating a method 800 for implementing age-based arbitration by traffic class. Although execution of method 800 is described below with reference to system 300, other suitable components for execution of method 800 may be utilized. Additionally, the components for executing method 800 may spread among multiple devices. Method 800 may be implemented in the form of executable instructions stored on a machine-readable storage medium and/or in the form of electronic circuitry, e.g. hardware. In some examples, steps of method 800 may be executed substantially concurrently or in a different order than shown in FIG. 8. In some examples, method 800 may include more or less steps than are shown in FIG. 8. In some examples, some of the steps of method 800 may, at certain times, be ongoing and/or may repeat.

At block 802, a set of requests of a plurality of traffic classes may be received, e.g. requests 320-330, at an arbiter, such as arbiter 302. Each request received may be associated with a traffic class, and each request may be associated with any number of different traffic classes. At block 804, each received request may be mapped to a traffic class. In an example, this mapping may be fixed. For example, OR gates 342-346 may map each requester to a particular traffic class such that requests from a requester mapped to a particular traffic class are associated with that particular traffic class. In another example, the mapping of requests to traffic classes may be programmable as described above with reference to FIG. 6.

At block 806, a traffic class of the set of requests may be selected. The traffic class may be selected, for example, by turn-based arbitration logic 350 of arbiter 302. The traffic class may be selected by any of the turn-based arbitration schemes as described above. By mapping the requests to traffic classes prior to selecting a traffic class according to a turn-based arbitration scheme, a traffic class of the received requests may be selected.

At block 808, the arbiter that selected the traffic class, e.g. arbiter 302, may output a control signal value associated with the selected traffic class. Arbiter 302 may further output any number of control signal values, e.g. control signal value 380a, control signal value 380b, and control signal value 380c, indicating the selected traffic class.

At block 810, requests not associated with the selected traffic class may be filtered such that a subset of requests of the selected traffic class is generated. For example, the control signal value may be received by arbiter 304, and may specifically be received by selector 370 of arbiter 304. The control signal values may, for example, be transmitted as a "1" to AND gates 372-382 of selector 370, enabling requests of particular requesters, and thus of a particular traffic class, to pass. Conversely, control signal values may be transmitted as a "0" to AND gates 372-382 of selector 380, such that requests of particular requesters not of the selected traffic class are not passed. In this example implementation, control signal 380 enables requests of the traffic class selected at arbiter 302 to pass through selector 370 to be received by age-based arbitration logic 360. Thus, a control signal value may indicate a selected traffic class by enabling a subset of requests of the selected traffic class to pass through a selector.

At block 812, a request from each traffic class of the subset of requests received by the second arbiter, e.g. arbiter 304, may be selected according to age-based arbitration logic. The request from each traffic class of the received requests may be selected according to any of the age-based arbitration schemes described above. At block 814, a request selected by the age-based arbitration logic 360 and of the selected traffic class may be granted, i.e. through any of grant lines 332-342, and specifically, may be granted access to a shared pool of resources.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A processor implemented method comprising:
   receiving a first set of requests for access to a shared pool of resources, wherein each request of the set of requests is of a traffic class of a plurality of traffic classes;
   selecting, according to turn-based arbitration logic, a traffic class of the plurality of traffic classes, wherein the traffic class is selected according to a turn-based arbitration scheme, and wherein the turn-based arbitration logic demotes the priority of the selected traffic class after selecting the traffic class;
   receiving a second set of requests derived from at least one of the plurality of traffic classes;
   selecting, according to age-based arbitration logic, a request from each traffic class; and
   granting, to a request selected by the age-based arbitration logic and of the selected traffic class, access to a shared pool of resources.

2. The processor implemented method of claim 1, wherein the traffic class is selected at a first arbiter and the request from each traffic class is selected at a second arbiter, and further comprising:
   outputting a control signal value associated with the selected traffic class at the first arbiter; and
   filtering requests not associated with the selected traffic class from the set of requests via the control signal value, the filtered requests to be the subset of requests received by the age-based arbitration logic at the second arbiter.

3. The processor implemented method of claim 1, wherein the turn-based arbitration logic demotes the selected traffic class to a lowest priority upon selecting the traffic class.

4. The processor implemented method of claim 1, wherein the selected traffic class is selected according to a turn-based arbitration scheme and a weighted priority.

5. The processor implemented method of claim 1, wherein the age-based arbitration logic selects the oldest request of a traffic class.

6. The processor implemented method of claim 1, wherein the age-based arbitration logic selects a request of a traffic class not selected the greatest number of times among the received requests of the traffic class.

7. The processor implemented method of claim 1, further comprising mapping each request of the set of requests to a traffic class from which the request is derived.

8. The processor implemented method of claim 1, wherein the set of requests are received via requesters, wherein each requester is programmed to map to a traffic class of the plurality of traffic classes.

9. The processor implemented method of claim 1, wherein the selected traffic class has a first weighted priority and a non-selected traffic class of the plurality of traffic classes has a second weighted priority lesser than the first weighted priority, wherein, because the second weighted priority is lesser than the first weighted priority, the selected traffic class is demoted to a lesser degree than would the non-selected traffic class had the non-selected traffic class been selected.

10. A system comprising:
    a first arbiter to receive a set of requests, the first arbiter including turn-based arbitration logic to select a first traffic class of a plurality of traffic classes according to a turn-based arbitration scheme and output a control signal associated with the selected first traffic class;
    a selector to:
       receive, the set of requests and the control signal; and
       filter requests not associated with the selected traffic class from the set of requests as indicated by the control signal; and
    a second arbiter including age-based arbitration logic to:
       receive the filtered requests selected by the selector; and
       select a request according to an age-based arbitration scheme.

11. The system of claim 10, wherein the second arbiter, according to the age-based arbitration scheme, selects a request of the first traffic class not selected the greatest number of times among the received requests of the first traffic class.

12. The system of claim 10, wherein the turn-based arbitration logic, according to the turn-based arbitration scheme, demotes the selected traffic class to a lowest priority upon outputting the control signal value associated with the selected traffic class.

13. A device comprising:
    a first arbiter having first arbitration logic to:
       receive a set of requests to a shared pool of resources, each request of a traffic class of a plurality of traffic classes;
       select a traffic class from the plurality of different traffic classes according to a turn-based arbitration scheme; and
       output a control signal value associated with the selected traffic class; and
    a second arbiter having second arbitration logic to:

receive filtered requests from the set of requests associated with the selected traffic class; and select a request of the filtered requests according to age-based arbitration logic.

14. The device of claim 13, further comprising a class mapper to map each request of the first set of requests to a traffic class from which the request is derived.

15. The device of claim 13, wherein the request of the filtered requests selected is granted access to a shared pool of resources.

16. The device of claim 15, further comprising a selector to receive the signal and each request selected by the age-based arbitration logic, the selector to grant access to requests selected by the age-based arbitration logic and of the traffic class indicated by the control signal value to the shared pool of resources.

17. They device of claim 16, wherein the selector is a demultiplexer.

18. They device of claim 17, wherein the multiplexer filters out requests only associated with the selected traffic class.

19. The device of claim 13, further comprising a multiplexer to receive the control signal value and filter the requests based on the control signal value.

20. The device of claim 13, wherein the first arbiter demotes a priority of the selected traffic class upon selecting the traffic class.

* * * * *